P. TOKAJI.
FRUIT GATHERER.
APPLICATION FILED MAY 5, 1915.

1,159,810.

Patented Nov. 9, 1915.
2 SHEETS—SHEET 1.

Inventor
P. Tokaji

By A. W. Wilson
Attorney

COLUMBIA PLANOGRAPH CO., WASHINGTON, D. C.

P. TOKAJI.
FRUIT GATHERER.
APPLICATION FILED MAY 5, 1915.

1,159,810.

Patented Nov. 9, 1915.
2 SHEETS—SHEET 2.

Inventor
P. Tokaji

Attorney

UNITED STATES PATENT OFFICE.

PAUL TOKAJI, OF ETHEL, WEST VIRGINIA.

FRUIT-GATHERER.

1,159,810.   Specification of Letters Patent.   Patented Nov. 9, 1915.

Application filed May 5, 1915. Serial No. 25,921.

*To all whom it may concern:*

Be it known that I, PAUL TOKAJI, subject of the King of Hungary, residing at Ethel, in the county of Logan and State of West Virginia, have invented certain new and useful Improvements in Fruit-Gatherers, of which the following is a specification.

This invention relates to certain new and useful improvements in fruit gatherers.

The primary object of this invention is to provide an easy manner of gathering fruit such as apples, the same being received without injury and readily transferred for packing.

A further object of the device is to provide a tree-encircling padded collector for receiving fruit dropped from the tree and thereby quickly collecting the fruit without bruising the same, while the means is also provided for transferring gathered fruit from the collector.

With these general objects in view and others that will appear as the nature of the invention is better understood, the same consists in the combination and arrangement of parts hereinafter more fully described, illustrated in the accompanying drawings, and pointed out in the appended claims.

Figure 1:
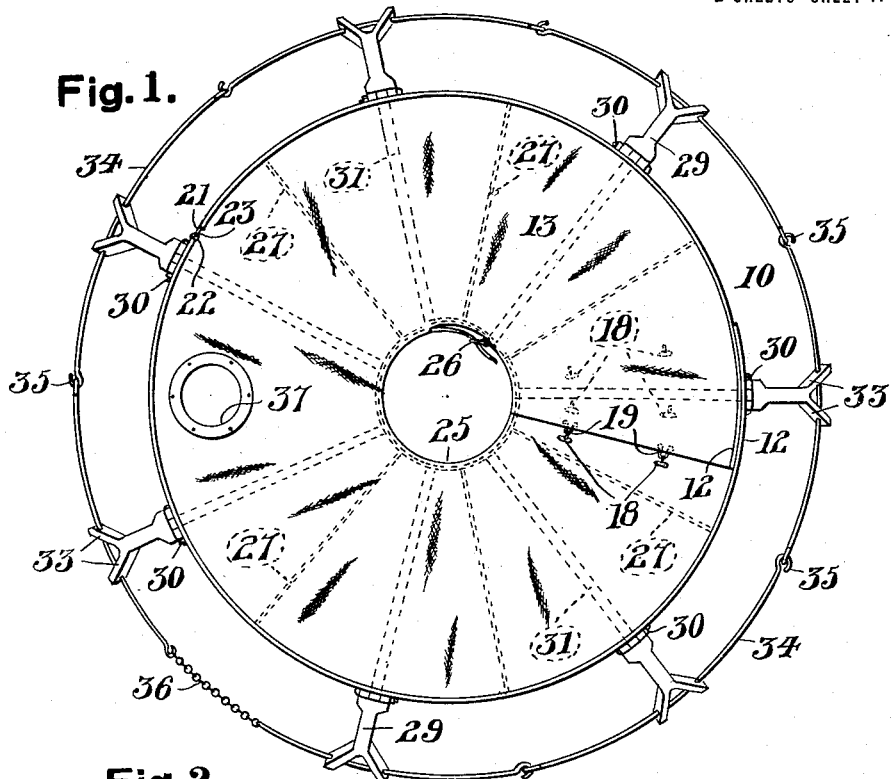
Figure 2:
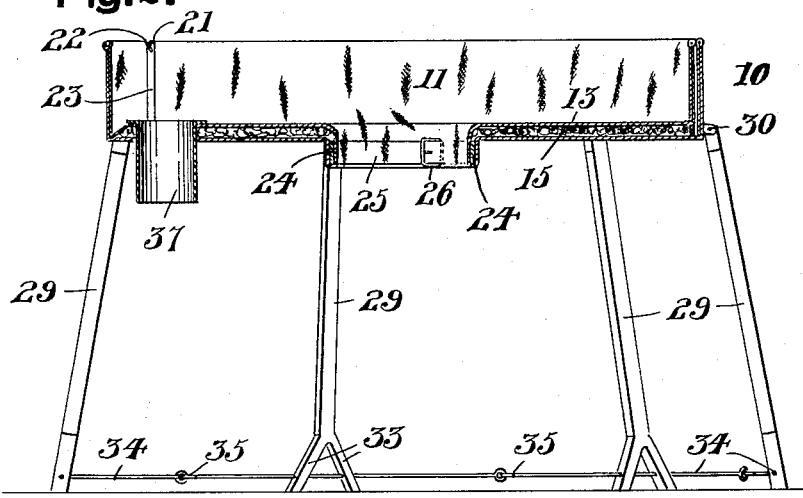
Figure 3:
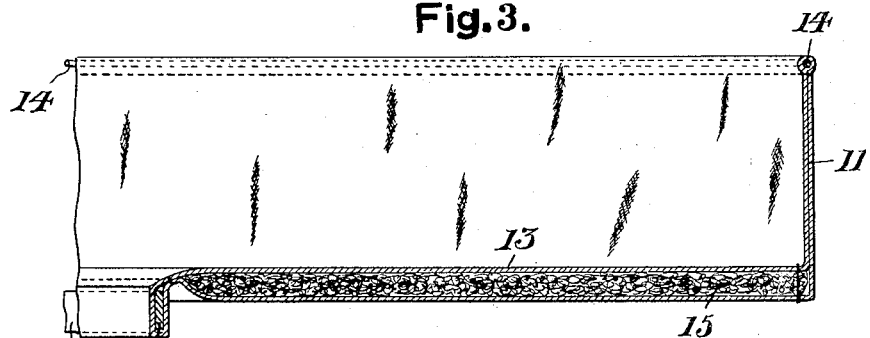
Figure 4:
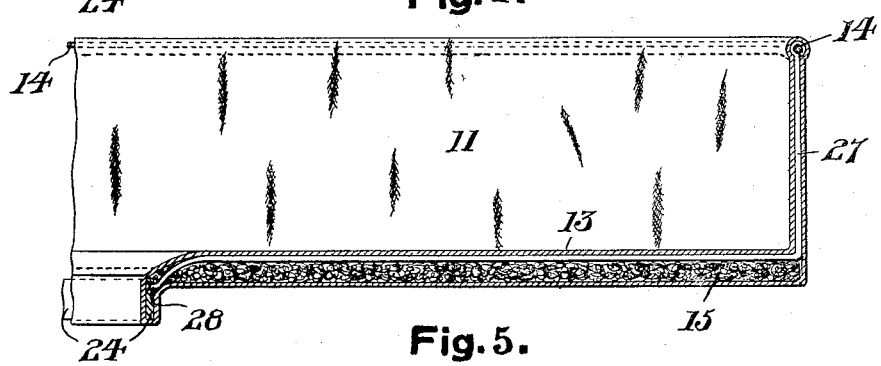
Figure 5:
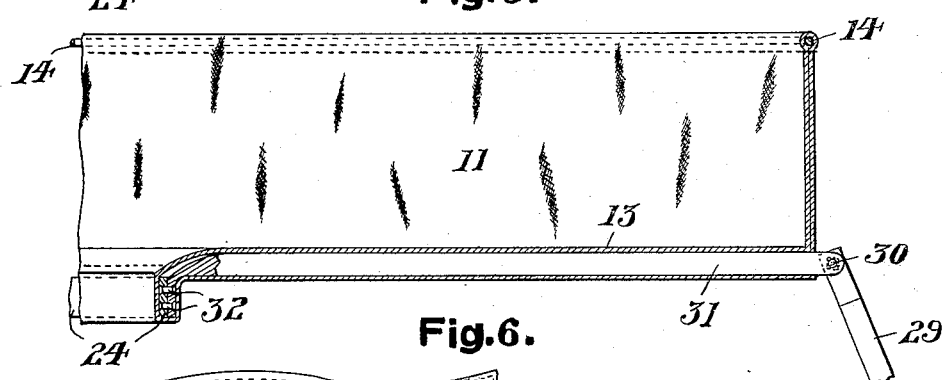
Figure 6:
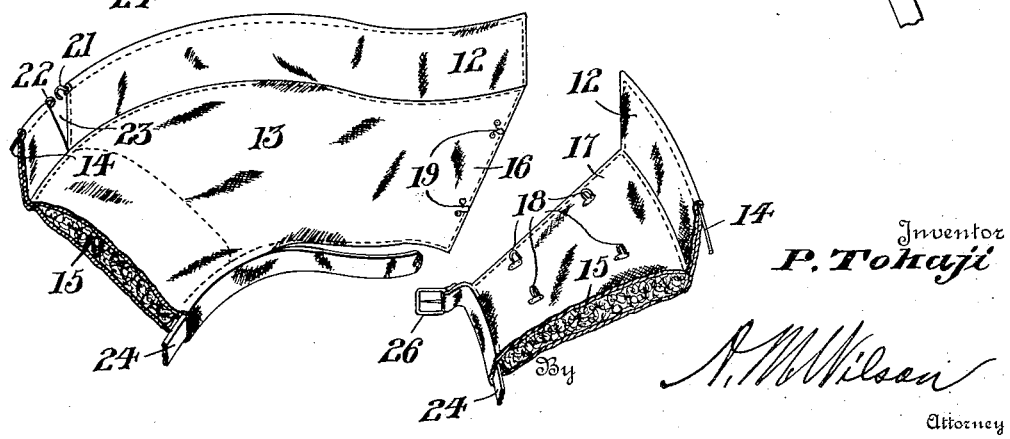

In the drawings forming a part of this application and in which like-designating characters refer to corresponding parts throughout the several views:—Figure 1 is a top plan view of the device assembled disconnected from a tree. Fig. 2 is a central vertical transverse sectional view thereof. Figs. 3, 4 and 5 are vertical radial sectional views of the same, and Fig. 6 is a perspective view of the overlapping end portions of the collection member.

A fruit receiving basin or hopper 10 is provided formed of canvas or other flexible material and having a marginal upright side 11 arranged annularly adjustable in diameter by overlapping its opposite ends 12. The hopper bottom 13 is normally positioned horizontally and is formed of the same material as the sides, the fabric forming the sides and bottom being double and having a binding ring 14 arranged positioned around within the fabric at the upper edge of the hopper side 10 forming a bead. The fabric at the side is flatly engaged together as best shown in Figs. 3 and 5, while throughout the bottom 13, the fabric walls are separated and have a cushioning filler 15 arranged therebetween. The bottom member 13 at one end portion 16 thereof is provided with the filler 15 and adapted to overlie the adjacent end portion 17 of the bottom, while hooks 18 are carried by the end portion 17 to engage the eyes 19 of the portion 16 and whereby the bottom member may be retained adjustably positioned as found desirable.

The side wall 11 of the hopper is severed as at 23, the two portions of the wall being disengageably connected together by means of a hook and eye 21 and 22 respectively carried by the bead wire 14. An adjustable securing strap 24 is arranged around the inner central opening 25 of the hopper bottom and is provided with a buckle 26 whereby the hopper may be secured encircling trees of different diameters, the hopper bottom and side being adjusted to correspond therewith.

Angularly braced rods 27 are secured at one end to the bead wires 14 and extending between the layers of fabric forming the hopper side and bottom and have their opposite inner ends secured as at 28 to the said strap 24, it being noted that any desired number of the said rods may be employed thus radially positioned in the hopper. A plurality of supporting legs 29 are hingedly carried by the hopper bottom, being hinged as at 30 to radially arranged arms 31 positioned between the fabric walls of the bottom 13 and having their inner ends secured as at 32 to the said strap 24. The free ends of the legs 29 are provided with outwardly projecting feet 33 and whereby the hopper is mounted substantially horizontally encircling the tree with the legs 29 arranged substantially vertical. A connecting hoop is provided for the feet 33 consisting of separate links 34 for each of the legs. The said links are connected together by hooked ends 35, the connection between two of the said links being made adjustable by the insertion of a connecting chain 36.

It will thus be seen that with the hopper secured around the trunk of a fruit tree and mounted upon the supporting legs 29, fruit may be removed from the tree by shaking the tree or by the use of poles and the fruit will drop into the hopper upon the cushioned bottom 13 thereof, and thus collected without in any manner bruising the fruit. An outlet pipe 37 is arranged through the hopper bottom 13 and the fruit in the hopper may be moved around therein by the use of a rake or any desirable implement so as to drop through the outlet 37 and be received into a wagon or into barrels, crates or whatever containers may be desired. It is to be understood that the legs 29 are of sufficient length to allow the hopper to be arranged adjacent the lower branches of the tree and preferably high enough for allowing persons to walk under the hopper and in this event a ladder or supported platform (not shown) is employed by the operator who may employ a rake for directing the fruit to the hopper outlet 37.

While the form of the invention herein shown and described is what is believed to be the preferred embodiment thereof, it is nevertheless to be understood that minor changes may be made without departing from the spirit and scope of the invention as claimed.

What I claim as new is:—

1. A fruit gatherer comprising a hopper having a bottom, an annular side wall formed of fabric of double thickness and having overlapping ends, said bottom having a central tree-receiving opening therein, a bead wire between the folds of said fabric at the upper edge of the wall, an adjustable strap secured within said fabric surrounding the central opening, angular brace rods between the folds of said fabric extending radially of the bottom and within the hopper side and being secured at their outer ends to the binding wire and at their inner ends to said strap, a fruit outlet extending through the hopper bottom, radial arms within the bottom extending beyond the side edges, supporting legs hinged to the outer ends of the arms, and means for limiting the outward movement of the supporting legs.

2. A fruit gatherer comprising a hopper having a bottom, an annular side wall formed of fabric of double thickness and having overlapping ends, said bottom having a central tree-receiving opening therein, a bead wire between the folds of said fabric at the upper edge of said wall, an adjustable strap secured within said fabric surrounding the said central opening, angular brace rods between the folds of the fabric extending radially of the bottom and within the hopper side and being secured at their outer ends to the binding wire and at their inner ends to said strap, a fruit outlet extending through the hopper bottom, radially arranged arms and interposed padding within the hopper bottom, the inner ends of the said arms being secured to said strap, supporting legs hinged to the outer ends of said arms, feet upon the free ends of the legs, separate links pivotally connected together and secured to the feet, an adjustable connector between two of the links, and adjustable connecting means between the overlapped portions of the hopper bottom.

In testimony whereof I affix my signature.

PAUL TOKAJI.

Witnesses:
A. J. DWECHEWSKY,
FRENK LAPOSTYAN.

Copies of this patent may be obtained for five cents each, by addressing the "Commissioner of Patents, Washington, D. C."